(12) United States Patent
Liu et al.

(10) Patent No.: US 9,673,903 B2
(45) Date of Patent: Jun. 6, 2017

(54) METHOD AND APPARATUS FOR RECEIVING VISIBLE LIGHT SIGNAL

(71) Applicant: KUANG-CHI INTELLIGENT PHOTONIC TECHNOLOGY LTD., Shenzhen (CN)

(72) Inventors: Ruopeng Liu, Shenzhen (CN); Linyong Fan, Shanzhen (CN); Chunlai Li, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 15/011,569

(22) Filed: Jan. 31, 2016

(65) Prior Publication Data

US 2016/0164606 A1 Jun. 9, 2016

Related U.S. Application Data

(63) Continuation of application No. PCT/CN2014/082954, filed on Jul. 24, 2014.

(30) Foreign Application Priority Data

Jul. 31, 2013 (CN) .......................... 2013 1 0330068
Nov. 5, 2013 (CN) .......................... 2013 1 0544341

(51) Int. Cl.
*H04B 10/116* (2013.01)
*H04B 10/60* (2013.01)

(52) U.S. Cl.
CPC ........... *H04B 10/116* (2013.01); *H04B 10/60* (2013.01)

(58) Field of Classification Search
CPC .............................. H04B 10/116; H04B 10/60
USPC ......................................................... 398/118
See application file for complete search history.

(56) References Cited

U.S. PATENT DOCUMENTS

| | | | |
|---|---|---|---|
| 2005/0008075 A1* | 1/2005 | Chang | H04N 19/176 375/240.03 |
| 2010/0260385 A1* | 10/2010 | Chau | G06T 7/20 382/107 |
| 2011/0052214 A1 | 3/2011 | Shimada et al. | |
| 2014/0186049 A1* | 7/2014 | Oshima | H04B 10/1143 398/118 |
| 2014/0321859 A1* | 10/2014 | Guo | H04B 10/116 398/118 |

FOREIGN PATENT DOCUMENTS

| | | |
|---|---|---|
| CN | 101159821 A | 4/2008 |
| CN | 102331795 A | 1/2012 |
| CN | 103795467 A | 5/2014 |

(Continued)

*Primary Examiner* — Dalzid Singh
(74) *Attorney, Agent, or Firm* — Perkins Coie LLP

(57) ABSTRACT

The disclosure relates to a method and an apparatus for receiving a visible light signal. The method includes the following steps: controlling use of a camera as a light signal receiver to capture a group of continuous images covering an emitter, where the emitter emits visible light signals; and obtaining, from the group of continuous images, a visible light signal that comes from the emitter. In the disclosure, because a camera is used to receive a visible light signal, a visible light communication function can be implemented in various devices or systems under a premise that no hardware is newly added or modified.

19 Claims, 9 Drawing Sheets

(56) References Cited

FOREIGN PATENT DOCUMENTS

| | | |
|---|---|---|
| CN | 103812558 A | 5/2014 |
| JP | 2010147527 A | 7/2010 |
| WO | 2012058239 A1 | 5/2012 |

\* cited by examiner

METHOD AND APPARATUS FOR RECEIVING VISIBLE LIGHT SIGNAL

CROSS REFERENCE TO RELATED APPLICATIONS

This application is a continuation of PCT Application No. PCT/CN2014/082954 filed on Jul. 24, 2014, which claims priority to Chinese patent application No. 201310330068.1 of Jul. 31, 2013 and Chinese patent application No. 201310544341.0 of Nov. 5, 2013, all of which are incorporated herein by reference.

TECHNICAL FIELD

The disclosure relates to the visible light communication field, and in particular, to a method and an apparatus for receiving a visible light signal.

BACKGROUND

Visible light communication is an emerging, short-range, high-speed wireless light communications technology that is developed on a basis of an LED technology. A basic principle of visible light communication is that communication is performed by flashing an LED light source at a high frequency based on a characteristic that a switching speed of a light emitting diode (LED) is higher than that of a fluorescent lamp and an incandescent lamp. Presence of light represents binary 1, and absence of light represents binary 0. Information may be obtained after a high-speed light signal including digital information undergoes photoelectric conversion. In the wireless light communication technology, data is unlikely to be interfered with or captured, and an optical communication device can be easily made and is unlikely to be damaged or degaussed. Therefore, a wireless optical encryption key can be made according to the wireless light communication technology. Compared with microwave technologies, abundant spectrum resources can be used in the wireless light communication, which is incomparable with general microwave communication and wireless communication. In addition, the visible light communication is applicable to any communications protocol, and applicable to any environment. In terms of security, in contrast to conventional magnetic materials, there is no need to worry about a problem of degaussing or even to worry about unlawful interception of communication content. A wireless optical communication device features flexible and convenient installation and layout, and a low cost, and is applicable to large-scale popularity and application.

With fast promotion of visible light communication, a technology for using an LED of an electronic device to transmit a visible light signal is proposed, which makes it possible to implement short-range communication depending on visible light communication between the electronic device and another device. However, currently, a photodiode (for example, a PIN or an APD) based light signal receiver is generally used as a visible light signal receiving unit. After receiving a light signal, the light signal receiver performs photoelectric conversion, and then performs signal processing such as decoding an electrical signal obtained through conversion to restore an original signal. Therefore, if visible light is to be received by a receiving apparatus, an additional photodiode-based light signal receiver is required. This requires changing of hardware of the receiving apparatus, and increases a cost.

An idea of using a camera as a receive end in visible light communication is proposed, for example, in a patent application of CN1702984. However, a difference from a photodiode that senses a light intensity change of a single point is that a camera not only captures planar photosensitive images, but also needs to process these images to identify a visible light signal included therein. Although a general image processing technology for processing images to identify partial regions of different luminance or different colors is available, when the general technology is used to identify partial regions in continuous photosensitive images shot by the camera, neither efficiency nor a speed thereof is ideal.

In view of this, a special method for identifying a visible light signal received by a camera is expected.

SUMMARY

A technical problem to be solved by the disclosure is to provide a method and an apparatus for receiving a visible light signal, where a camera is used to receive visible light.

A technical solution used by the disclosure to solve the foregoing technical problem is to provide a method for receiving a visible light signal, where the method includes the following steps: controlling use of a camera as a light signal receiver to capture a group of continuous images covering an emitter, where the emitter emits visible light signals; dividing the group of continuous images into a plurality of images; comparing luminance variation with time of each region with a predetermined size of all images, selecting a region with continuous varying luminance, and determining that a visible light signal exists in the region; and analyzing and processing luminance changes of the region of all the images to obtain a visible light signal that comes from the emitter.

In an embodiment of the disclosure, after obtaining the visible light signal that comes from the emitter, the method further includes: processing the visible light signal to restore original information.

In an embodiment of the disclosure, the comparing luminance variation with time of each region with a predetermined size of all images includes analyzing variation with time of average grey value of each region with the predetermined size.

In an embodiment of the disclosure, the step of processing the visible light signal includes decoding, decryption, and/or descrambling.

In an embodiment of the disclosure, the step of controlling use of a camera as a light signal receiver includes: controlling use of an independent camera or a camera integrated in an electronic device as the light signal receiver, and connecting the independent camera to a security system, a surveillance system, or a computer.

In an embodiment of the disclosure, in the step of dividing the group of continuous images into a plurality of images, the images are frames of image; and the selecting a region with continuous varying luminance, and determining that a visible light signal exists in the region includes processing each frame of image according to the following steps to identify a light spot in the frame of image: searching for a pixel having a maximum grey value in the frame of image, and using it as a central point of a first light spot; determining a boundary of the first light spot; determining a size of the first light spot according to a distance between the boundary of the first light spot and the central point of the first light spot; determining, according to the determined boundary and size of the first light spot, whether the first light spot is a valid light spot; and restoring the visible light signal according to the identified light spot.

In an embodiment of the disclosure, the step of determining a boundary of the first light spot includes: sequentially calculating, in ascending order of distances along a first direction, grey values of pixels that are at distances from the central point of the first light spot, and using a previous pixel of a pixel with a grey value abruptly changing from that of the previous pixel in the first direction as a boundary of the first light spot in the first direction; and sequentially calculating, in ascending order of distances along a second direction, grey values of pixels that are at distances from the central point of the first light spot, and using a previous pixel of a pixel with a grey value abruptly changing from that of the previous pixel in the second direction as a boundary of the first light spot in the second direction.

In an embodiment of the disclosure, the first direction is opposite to the second direction.

In an embodiment of the disclosure, the step of using a previous pixel of a pixel with a grey value abruptly changing from that of the previous pixel in the first direction as a boundary of the first light spot in the first direction includes: if a grey value of a first pixel is less than a threshold of grey value, using a previous pixel of the first pixel as the boundary of the first light spot in the first direction, or otherwise, using a boundary of the frame of image in the first direction as the boundary of the first light spot in the first direction; and the step of using a previous pixel of a pixel with a grey value abruptly changing from that of the previous pixel in the second direction as a boundary of the first light spot in the second direction includes: if a grey value of a second pixel is less than the threshold of grey value, using a previous pixel of the second pixel as the boundary of the first light spot in the second direction, or otherwise, using a boundary of the frame of image in the second direction as the boundary of the first light spot in the second direction.

In an embodiment of the disclosure, the threshold of grey value is an average grey value of the frame of image.

In an embodiment of the disclosure, the step of determining, according to the determined boundary of the first light spot, whether the first light spot is a valid light spot, includes: determining whether any boundary of the first light spot is located at a boundary of the image, and if no, determining that the first light spot is a valid light spot.

In an embodiment of the disclosure, the step of determining, according to the determined size of the first light spot, whether the first light spot is a valid light spot, includes: determining whether the size of the first light spot is greater than a threshold, and if yes, determining that the first light spot is a valid light spot, where a greater value of a distance between the boundary of the first light spot in the first direction and the central point of the first light spot and a distance between the boundary of the first light spot in the second direction and the central point of the first light spot is selected as the size of the first light spot.

In an embodiment of the disclosure, the method further includes identifying a second light spot in the frame of image according to the following steps: searching for a pixel of a maximum grey value in regions outside the first light spot in the frame of image, and using it as a central point of the second light spot; determining a boundary of the second light spot; determining a size of the second light spot according to a distance between the boundary of the second light spot and the central point of the second light spot; and determining, according to the determined boundary and size of the second light spot, whether the second light spot is a valid light spot.

In an embodiment of the disclosure, the step of determining a boundary of the second light spot includes: sequentially calculating, in ascending order of distances along a first direction, grey values of pixels that are at distances from the central point of the second light spot, and using a previous pixel of a pixel with a grey value abruptly changing from that of the previous pixel in the first direction as a boundary of the second light spot in the first direction; and sequentially calculating, in ascending order of distances along a second direction, grey values of pixels that are at distances from the central point of the second light spot, and using a previous pixel of a pixel with a grey value abruptly changing from that of the previous pixel in the second direction as a boundary of the second light spot in the second direction.

In an embodiment of the disclosure, the step of searching for a pixel of a maximum grey value in regions outside the first light spot in the frame of image includes: setting grey values of pixels in the first light spot in the frame of image to an average grey value of the image to obtain a modified image; and searching for a pixel of a maximum grey value in the modified image.

In an embodiment of the disclosure, the step of using a previous pixel of a pixel with a grey value abruptly changing from that of the previous pixel in the first direction as a boundary of the second light spot in the first direction includes: if a grey value of a first pixel is less than a threshold of grey value, using a previous pixel of the first pixel as the boundary of the second light spot in the first direction, or otherwise, using a boundary of the frame of image in the first direction as the boundary of the second light spot in the first direction; and the step of using a previous pixel of a pixel with a grey value abruptly changing from that of the previous pixel in the second direction as a boundary of the second light spot in the second direction includes: if a grey value of a second pixel is less than the threshold of grey value, using a previous pixel of the second pixel as the boundary of the second light spot in the second direction, or otherwise, using a boundary of the frame of image in the second direction as the boundary of the second light spot in the second direction.

In an embodiment of the disclosure, the threshold of grey value is an average grey value of the frame of image.

In an embodiment of the disclosure, the step of processing each frame of image to identify a light spot in the frame of image further includes: zooming out the frame of image according to a predetermined ratio, where the predetermined ratio is a common divisor of the pixel number in a row and the pixel number in a column of the image.

In an embodiment of the disclosure, when the camera is normally in a low frame rate mode, the method further includes: identifying a start code of a predetermined sequence in the visible light signal; and switching the camera to a high frame rate mode; or, identifying an end element of a predetermined sequence in the visible light signal; and switching the camera to a low frame rate mode; where the method for switching a frame rate mode of the camera includes: modifying a register of a photosensitive device of the camera.

The disclosure further provides an apparatus for receiving a visible light signal, where the apparatus includes: a module configured to control use of a camera as a light signal receiver to capture a group of continuous images covering an emitter, where the emitter emits visible light signals; and a module configured to obtain, from the group of continuous images, a visible light signal that comes from the emitter, including: a module configured to divide the group of continuous images into a plurality of images; a module configured to compare luminance variation with time of each region with a predetermined size of all images, select a region with continuous varying luminance, and determine that a visible light signal exists in the region; and a module configured to analyze and process luminance changes of the region of all the images to obtain the visible light signal that comes from the emitter.

In an embodiment of the disclosure, the receiving apparatus further includes a module configured to process the visible light signal to restore original information.

In an embodiment of the disclosure, the comparing luminance variation with time of each region with a predetermined size of all images includes analyzing variation with time of average grey value of each region with the predetermined size.

In an embodiment of the disclosure, the module configured to process the visible light signal to restore original information performs decoding, decryption, and/or descrambling.

In an embodiment of the disclosure, the module configured to control use of a camera as a light signal receiver to capture a group of continuous images covering an emitter includes: a module configured to obtain, from the camera, a plurality of frames of image including a visible light signal; and the module configured to obtain, from the group of continuous images, a visible light signal that comes from the emitter, includes: a module configured to process each frame of image to identify a light spot in the frame of image, including: a module configured to search for a pixel having a maximum grey value in the frame of image, and use it as a central point of a first light spot; a module configured to determine a boundary of the first light spot; a module configured to determine a size of the first light spot according to a distance between the boundary of the first light spot and the central point of the first light spot; a module configured to determine, according to the determined boundary and size of the first light spot, whether the first light spot is a valid light spot; and a module configured to restore the visible light signal according to the identified light spot.

In an embodiment of the disclosure, the module configured to determine a boundary of the first light spot includes: a module configured to sequentially calculate, in ascending order of distances along a first direction, grey values of pixels that are at distances from the central point of the first light spot, and use a previous pixel of a pixel with a grey value abruptly changing from that of the previous pixel in the first direction as a boundary of the first light spot in the first direction; and a module configured to sequentially calculate, in ascending order of distances along a second direction, grey values of pixels that are at distances from the central point of the first light spot, and use a previous pixel of a pixel with a grey value abruptly changing from that of the previous pixel in the second direction as a boundary of the first light spot in the second direction.

In an embodiment of the disclosure, the first direction is opposite to the second direction.

In an embodiment of the disclosure, in the module configured to sequentially calculate, in ascending order of distances along a first direction, grey values of pixels that are at distances from the central point of the first light spot, and use a previous pixel of a pixel with a grey value abruptly changing from that of the previous pixel in the first direction as a boundary of the first light spot in the first direction, if a grey value of a first pixel is less than a threshold of grey value, a previous pixel of the first pixel is used as the boundary of the first light spot in the first direction, or otherwise, a boundary of the frame of image in the first direction is used as the boundary of the first light spot in the first direction; and in the module configured to sequentially calculate, in ascending order of distances along a second direction, grey values of pixels that are at distances from the central point of the first light spot, and use a previous pixel of a pixel with a grey value abruptly changing from that of the previous pixel in the second direction as a boundary of the first light spot in the second direction, if a grey value of a second pixel is less than the threshold of grey value, a previous pixel of the second pixel is used as the boundary of the first light spot in the second direction, or otherwise, a boundary of the frame of image in the second direction is used as the boundary of the first light spot in the second direction.

In an embodiment of the disclosure, the threshold of grey value is an average grey value of the frame of image.

In an embodiment of the disclosure, the module configured to determine, according to the determined boundary and size of the first light spot, whether the first light spot is a valid light spot, determines whether any boundary of the first light spot is located at a boundary of the image, and if no, determines that the first light spot is a valid light spot; or the module configured to determine, according to the determined boundary and size of the first light spot, whether the first light spot is a valid light spot, determines whether the size of the first light spot is greater than a threshold, and if yes, determines that the first light spot is a valid light spot.

In an embodiment of the disclosure, the module configured to process each frame of image to identify a light spot in the frame of image further includes: a module configured to search for a pixel of a maximum grey value in regions outside the first light spot in the frame of image, and use it as a central point of the second light spot; a module configured to determine a boundary of the second light spot; a module configured to select a distance between the boundary of the second light spot and the central point of the second light spot as a size of the second light spot; and a module configured to determine, according to the determined boundary of the second light spot, whether the second light spot is a valid light spot.

In an embodiment of the disclosure, the module configured to determine a boundary of the second light spot includes: a module configured to sequentially calculate, in ascending order of distances along a first direction, grey values of pixels that are at distances from the central point of the second light spot, and use a previous pixel of a pixel with a grey value abruptly changing from that of the previous pixel in the first direction as a boundary of the second light spot in the first direction; and a module configured to sequentially calculate, in ascending order of distances along a second direction, grey values of pixels that are at distances from the central point of the second light spot, and use a previous pixel of a pixel with a grey value abruptly changing from that of the previous pixel in the second direction as a boundary of the second light spot in the second direction.

In an embodiment of the disclosure, the first direction is opposite to the second direction.

In an embodiment of the disclosure, the module configured to search for a pixel of a maximum grey value in regions outside the first light spot in the frame of image, and use it as a central point of the second light spot includes: a module configured to set grey values of pixels in the first light spot in the frame of image to an average grey value of the image to obtain a modified image; and a module configured to search for a pixel of a maximum grey value in the modified image.

In an embodiment of the disclosure, in the module configured to sequentially calculate, in ascending order of distances along a first direction, grey values of pixels that are at distances from the central point of the second light spot, and use a previous pixel of a pixel with a grey value abruptly changing from that of the previous pixel in the first direction as a boundary of the second light spot in the first direction, if a grey value of a first pixel is less than a threshold of grey value, a previous pixel of the first pixel is used as the boundary of the second light spot in the first direction, or otherwise, a boundary of the frame of image in the first direction is used as the boundary of the second light spot in the first direction; and in the module configured to sequentially calculate, in ascending order of distances along a second direction, grey values of pixels that are at distances from the central point of the second light spot, and use a previous pixel of a pixel with a grey value abruptly changing from that of the previous pixel in the second direction as a boundary of the second light spot in the second direction, if a grey value of a second pixel is less than the threshold of grey value, a previous pixel of the second pixel is used as the boundary of the second light spot in the second direction, or otherwise, a boundary of the frame of image in the second direction is used as the boundary of the second light spot in the second direction.

In an embodiment of the disclosure, the threshold of grey value is an average grey value of the frame of image.

In an embodiment of the disclosure, the module configured to process each frame of image to identify a light spot in the frame of image further includes a module configured to zoom out the image according to a predetermined ratio, where the predetermined ratio is a common divisor of the pixel number in a row and the pixel number in a column of the frame of image.

In an embodiment of the disclosure, when the camera is normally in a low frame rate mode, the apparatus further includes: a module configured to identify a start code of a predetermined sequence in the visible light signal; a module configured to switch the camera to a high frame rate mode according to the identified start code; a module configured to identify an end element of the predetermined sequence in the visible light signal; and a module configured to switch the camera to a low frame rate mode according to the identified end element.

In the method for receiving a visible light signal in the foregoing technical solution of the disclosure, continuous images are captured by using a camera, and then image processing is performed on the continuous images to obtain a visible light signal. In the receiving method, because a camera is used to receive a visible light signal, a visible light communication function can be implemented in various devices or systems under a premise that no hardware is newly added or modified.

The foregoing technical solution of the disclosure uses a special processing method for processing and identifying a light spot in a visible light signal. By simply determining a boundary of a light spot to identify the light spot, the method has features of simplicity and efficiency in comparison with a general image processing technology.

BRIEF DESCRIPTION OF DRAWINGS

To make the foregoing objectives, features, and advantages of the disclosure more comprehensible, the following describes the embodiments of the disclosure in detail with reference to accompanying drawings.

FIG. 2A shows that the entire light spot is located in the image, FIG. 2B and FIG. 2C show that a part of the light spot falls outside the image, but a center of the light spot is still in the image, and FIG. 2D and FIG. 2E show that a part of the light spot falls outside the light spot and that the center of the light spot is also outside the image;

DESCRIPTION OF EMBODIMENTS

Currently, many electronic devices, for example, a mobile phone, a tablet computer, a notebook computer, a digital camera, an MP3 player (such as iTouch of Apple Inc.), and an MP4 player (such as iTouch of Apple Inc.), are all equipped with a camera. In comparison, a majority of electronic devices are not equipped with a photodiode-based light signal receiver. Therefore, embodiments of the disclosure provide a method for receiving a visible light signal, where a camera instead of the conventional photodiode-based light signal receiver as a light signal receiver is used in the method. Apparent advantages of the design are: a dedicated light signal receiver is not required in many application environments, and thereby a hardware cost is saved.

The disclosure to be protected is hereinafter described with reference to the accompanying drawings, and in all the accompanying drawings, same reference numbers are used to indicate same components or steps. In the following description, for the purpose of explanation, many specific details are disclosed to provide a comprehensive understanding about the subject matter to be protected. However, apparently, the disclosure may also be implemented without using these specific details.

The embodiments of the disclosure may be implemented in an environment in which a mobile phone is used as an apparatus for receiving a visible light signal. An emitter may be a light emitting diode (LED) or a chip of a light emitting diode. The light emitting diode may be integrated in electronic devices such as a mobile phone, a tablet computer, a notebook computer, a digital camera, an MP3 player, or an MP4 player. The light emitting diode may also be an independent apparatus, for example, a lamp. Visible light emitted by the lamp may be modulated by a control apparatus and thereby carries a signal.

Figure 1:
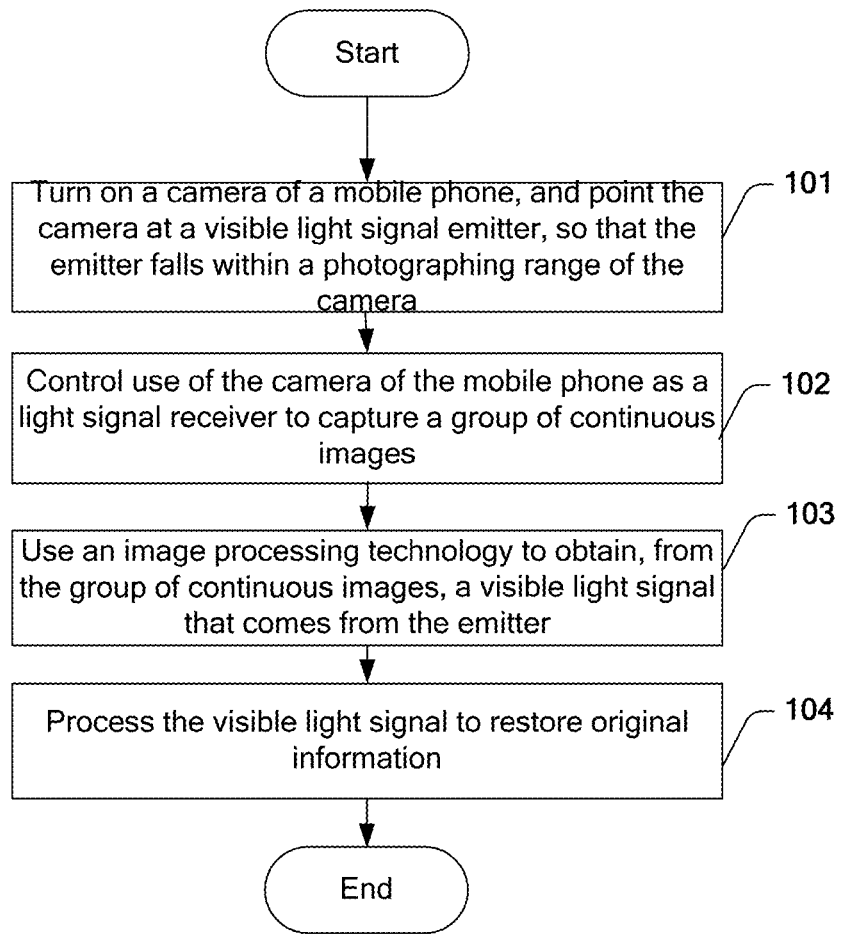
FIG. 1 shows a flowchart of a method for receiving a visible light signal according to an embodiment of the disclosure.

FIG. 1 shows a flowchart of a method for receiving a visible light signal according to an embodiment of the disclosure. Referring to FIG. 1, the method includes:

Step 101: Turn on a camera of a mobile phone, and point the camera at a visible light signal emitter, so that the emitter falls within a photographing range of the camera.

Step 102: Control the camera of the mobile phone as a light signal receiver to capture a group of continuous images.

The group of continuous images includes an image of a visible light signal of the emitter and background images. Therefore, it is crucial to separate the image of the visible light signal from the background images.

Step 103: Obtain a visible light signal emitted by the emitter from the group of continuous images, by using an image processing technology.

Step 104: Process the visible light signal to restore original information.

In this embodiment, the original information includes but is not limited to a text, a picture, an audio, and/or a video.

In step 103, the method of obtaining a visible light signal emitted by the emitter from the group of continuous images, by using an image processing technology, includes:

firstly, dividing the group of continuous images into a plurality of images;

then, comparing luminance variation with time of each region with a predetermined size of all images, selecting one region with continuously varying luminance, and determining that the visible light signal that comes from the emitter exists in the region; and determining that other regions with luminance not continuously varying are background patterns; and further then, analyzing and processing luminance changes of the region of all the images to obtain the visible light signal that comes from the emitter.

In this embodiment, in the step of comparing luminance variation with time of each region with a predetermined size of all images, the luminance variation with time may be represented by variation with time in average grey value. When the visible light signal does not exist, the average grey value of the image is small. When the visible light signal exists, the average grey value becomes greater apparently. By comparing the average grey values, whether the visible light signal exists in the image may be determined. In the step of selecting one region with continuously varying luminance, and determining that the visible light signal coming from the emitter exists in the region, a location of a light spot formed by light emitted by the emitter in the image may be determined. The detailed method may be a method for identifying a visible light signal received by a camera in a following embodiment.

In the mobile phone, a dedicated video processing module may be configured to analyze and process the obtained continuous images to separate the visible light signals in the continuous images.

According to the processing of the emitter, for example, encoding, encryption, and/or scrambling, in step 104, the step of processing the visible light signal may correspondingly include reverse processing, for example, decoding, decryption, and/or descrambling.

When the images captured by the camera include the visible light signal of the emitter, the original information separated in the foregoing step may be independent from a background image and transmitted to a subsequent module. When the images captured by the camera do not include the visible light signal of the emitter, common background images are output after the foregoing step.

In the method provided by this embodiment in which a camera of a mobile phone is used to receive a visible light signal, the camera of the mobile phone is pointed at a visible light signal emitter to capture continuous images, then image processing is performed on the continuous images to obtain a visible light signal, and further then signal processing such as decoding is performed on the visible light signal to restore original information. Because the camera of the mobile phone is used to receive a visible light signal in this method, a function of receiving a visible light signal by using the mobile phone may be implemented under a premise that no component of the mobile phone is newly added or modified. In this way, the mobile phone may receive data such as texts, pictures, audios, and/or videos from another mobile phone or a tablet computer, when the mobile phone does not interconnect with the another mobile phone or the tablet computer.

The disclosure may be implemented in an environment in which a mobile phone is used as an apparatus for receiving a visible light signal, or may be implemented in an environment in which a tablet computer is used as an apparatus for receiving a visible light signal. The camera in the disclosure may be integrated in the mobile phone and the tablet computer, or may be integrated in other electronic devices, such as a notebook computer, a digital camera, an MP3 player, or an MP4 player.

The disclosure may also be implemented in an environment in which an independent camera is used as an apparatus for receiving a visible light signal. In the method in which an independent camera is used to receive a visible light signal, the independent camera is pointed at a visible light signal emitter to capture continuous images, then image processing is performed on the continuous images to obtain a visible light signal, and then signal processing such as decoding is performed on the visible light signal to restore original information. Because an independent camera is used to receive a visible light signal in this method, a visible light communication function may be provided for many systems that are normally equipped with a camera, and other systems may also be equipped with a camera to obtain an extended visible light communication function. For example, a security system or a surveillance system is generally equipped with many cameras. If these cameras are used to receive visible light signals, and then subsequent image processing and signal processing are performed in the system, a visible light communication function can be implemented. In addition, for a desktop computer or a notebook computer not equipped with a camera, an external camera may be connected, so that an extended visible light communication function may be obtained while a video shooting function is obtained. When a desktop computer or a notebook computer is used as a host, this function may make it convenient to obtain data from a portable electronic device such as a mobile phone, a tablet computer, or a digital camera.

In the foregoing embodiment of the disclosure, the camera may be of a charge coupled device (CCD) type or a complementary metal-oxide-semiconductor (CMOS) type.

In the method for receiving a visible light signal according to the foregoing embodiment of the disclosure, a camera is pointed at a visible light signal emitter to capture continuous images, then image processing is performed on the continuous images to obtain a visible light signal, and then signal processing such as decoding is performed on the visible light signal to restore original information. In the receiving method, because a camera is used to receive a visible light signal, a visible light communication function can be implemented in various devices or systems under a premise that no hardware is newly added or modified.

The disclosure further provides an apparatus for receiving a visible light signal. The apparatus includes: a module configured to control use of a camera as a light signal receiver to capture a group of continuous images covering an emitter, where the emitter emits visible light signals; and a module configured to obtain, from the group of continuous images, a visible light signal that comes from the emitter.

The receiving apparatus further includes a module configured to process the visible light signal to restore original information.

The module configured to obtain, from the group of continuous images, a visible light signal that comes from the emitter, includes: a module configured to divide the group of continuous images into a plurality of images; a module configured to compare luminance variation with time of each region with a predetermined size of all images, select one region with continuously varying luminance, and determine that a visible light signal exists in the region; and a module configured to analyze and process luminance changes of the region of all the images to obtain the visible light signal that comes from the emitter.

The module configured to process the visible light signal to restore original information performs decoding, decryption, and/or descrambling.

An embodiment of the disclosure further provides a method for identifying a visible light signal received by a camera. The method may be an exemplary implementation manner of the method for receiving a visible light signal according to an embodiment of the disclosure. The method of this embodiment may be used in the foregoing method for receiving a visible light signal, to determine a location of a light spot formed by light emitted by an emitter in an image. This method is particularly intended for an image including a visible light signal, and in particular, an image including a light spot. Therefore, an identification process is simplified and becomes more efficient.

The disclosure to be protected is hereinafter described with reference to the accompanying drawings, and in all the accompanying drawings, same reference numbers are used to indicate same components or steps. In the following description, for the purpose of explanation, multitudinous specific details are disclosed to provide a comprehensive understanding about the subject matter to be protected. However, apparently, the disclosure may also be implemented without using these specific details.

A light source used at a transmit end in visible light communication includes a light emitting diode (LED), which is widely applied due to its good turn-on/turn-off performance. In addition, using a flash of a portable electronic device that has a camera function is also a feasible choice, especially in a case in which popular mobile phones each are generally equipped with a flash but not equipped with an LED. Certainly, the type of some flashes is an LED.

In the embodiment of the disclosure, the camera is applicable to receiving the visible light emitted by the light source, but is not limited thereto. The camera in the disclosure may be an independent camera, or may be a camera integrated in various electronic devices, for example, a mobile phone, a tablet computer, a notebook computer, a digital camera, an MP3 player, or an MP4 player (such as iTouch of Apple Inc.).

Figure 2A:
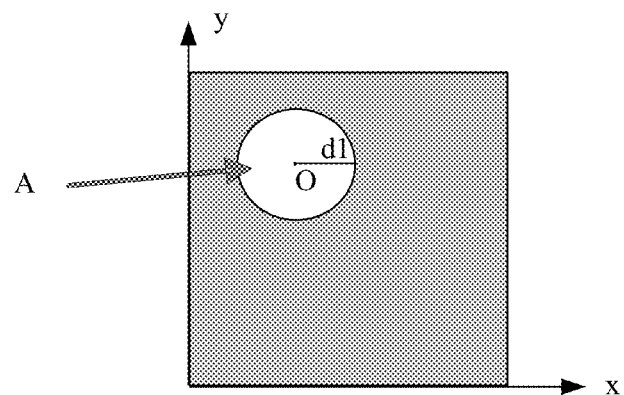
FIG. 2A to FIG. 2E show various cases of locations of light spots in a frame of image that has one light spot, where

When a camera is used to shoot continuously, if visible light is received at a moment of shooting, there is a light spot in an image shot by the camera. FIG. 2A shows a frame of image having one light spot.

Figure 3:
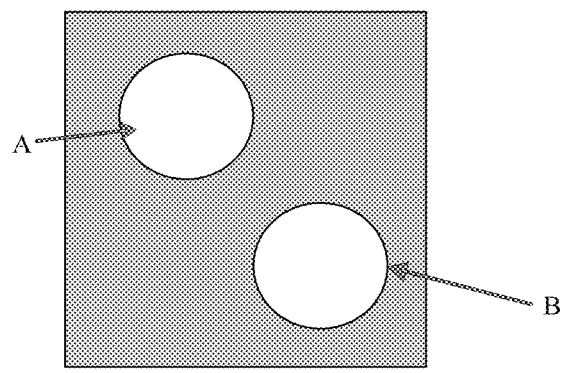
FIG. 3 shows a frame of image having two light spots.

It is understandable that when different transmit ends respectively emit different light beams, one frame of image shot by the camera may have a plurality of light spots. FIG. 3 shows a frame of image that has two light spots.

After the receive end obtains these images from the camera, an important task of the receive end is to determine images including light spots, and thereby restoring corresponding digital signals. For example, when an emitter defines that presence of light represents binary digit 1 and that absence of light represents binary digit 0. A receive end correspondingly identifies an image including a light spot as binary digit 1, and identifies an image not including a light spot as binary digit 0. Certainly, this definition is just an example. Detailed rules may be defined by a person skilled in the art at discretion. For example, additional information may be represented if a plurality of light spots are included.

Figure 7:
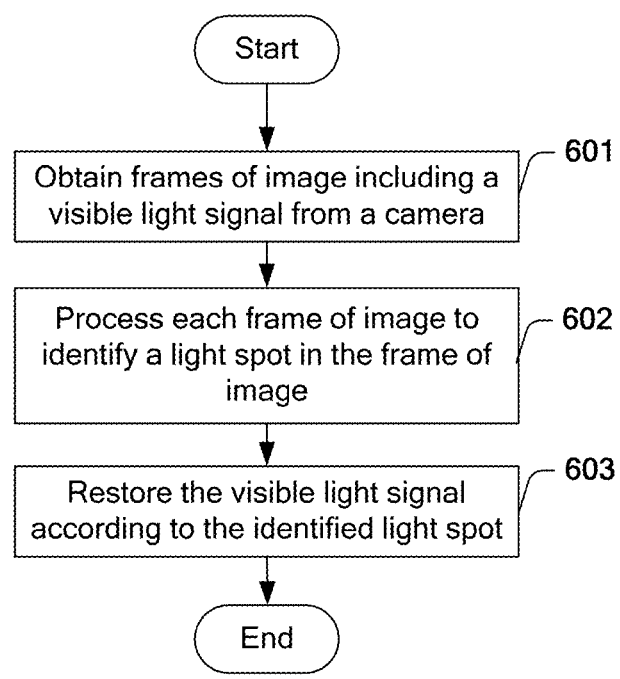
FIG. 7 shows a flowchart of a method for identifying a visible light signal received by a camera according to an embodiment of the disclosure.

FIG. 7 shows a flowchart of a method for identifying a visible light signal received by a camera according to an embodiment of the disclosure. Referring to FIG. 7, the method includes the following steps:

Step 601: Obtain frames of image including a visible light signal from a camera.

Step 602: Process each frame of image to identify a light spot in the frame of image.

Step 603: Restore the visible light signal according to the identified light spot.

It is understandable that the foregoing process is generally performed according to a streamline mode. That is, when a frame of image is obtained each time, image processing is performed, and a visible light signal in the frame of image is restored.

Figure 8:
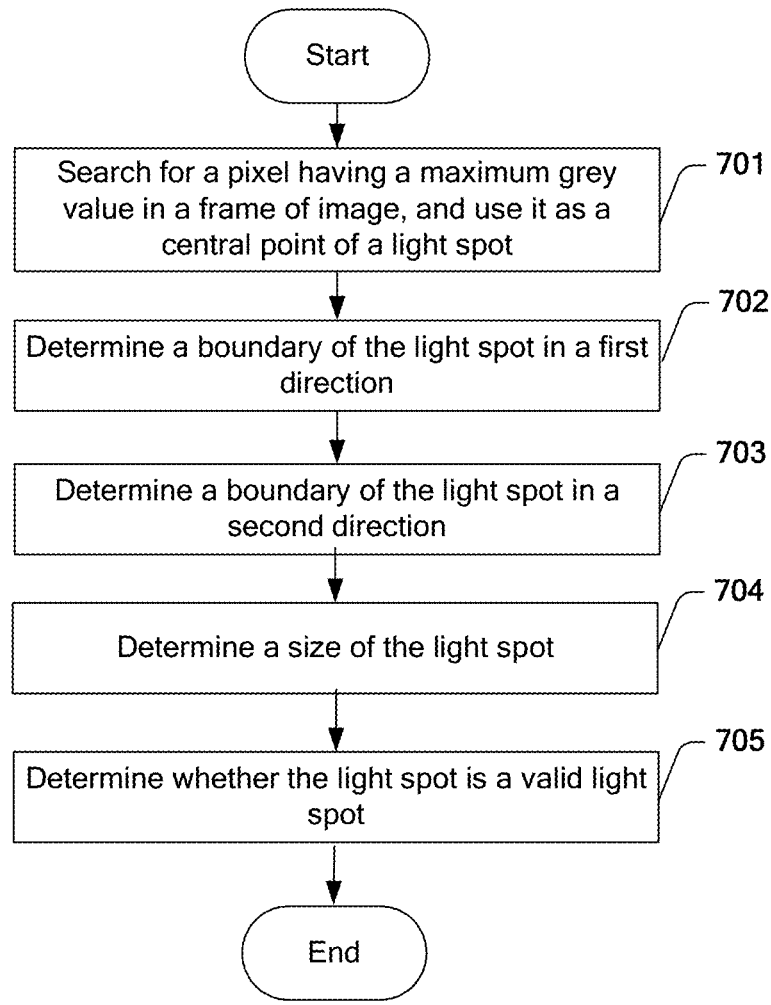
FIG. 8 shows a flowchart of a method for identifying a light spot in an image according to an embodiment of the disclosure.

In the foregoing process, step 602 is a main step. Referring to FIG. 8, a method of step 602 is described in detail as follows:

Step 701: Search for a pixel having a maximum grey value in a frame of image, and use it as a central point of a light spot.

Step 702: Determine a boundary of the light spot in a first direction.

Many known algorithms are available for determining the boundary of the light spot. Herein, a simple algorithm is described. In detail, grey values of pixels that are at distances from the central point of the light spot may be sequentially calculated in ascending order of distances along the first direction, and a previous pixel of a pixel with a grey value abruptly changing from that of the previous pixel in the first direction is used as the boundary of the light spot in the first direction.

That is, in the foregoing calculation process, the grey values of the pixels are compared with a threshold of grey value. If the grey value of a pixel is greater than or equal to a threshold of grey value such as an average grey value of the image, it is considered that the pixel belongs to the region of a light spot. Conversely, if the grey value of the pixel is less than the average grey value of the image, it is considered that the pixel does not belong to the region of the light spot. A previous pixel of a pixel with a grey value abruptly changing from that of the previous pixel is less than the average grey value of the image is used as the boundary of the light spot in the first direction, and is recorded as a first pixel. A distance between the first pixel and the central point of the light spot is recorded as a first distance.

The light spot is generally considered as a circle. Therefore, the first distance may be considered as a radius of the light spot. Taking FIG. 2A as an example, a first distance d1 determined along a +x direction is the radius of the light spot.

Figure 2B:
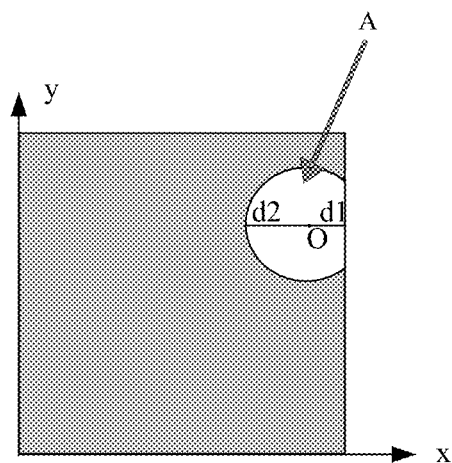

However, a case shown in FIG. 2B exists. In this case, because the emitter is not accurately aimed at the camera, the light spot just partly located within an image region. Therefore, in the calculation process in step 702, if the calculated pixel is already located at a boundary of the image, calculation is stopped. Likewise, the pixel is recorded as the first pixel, and the first distance d1 is obtained. The same is applied to the case shown in FIG. 2C.

Figure 2C:
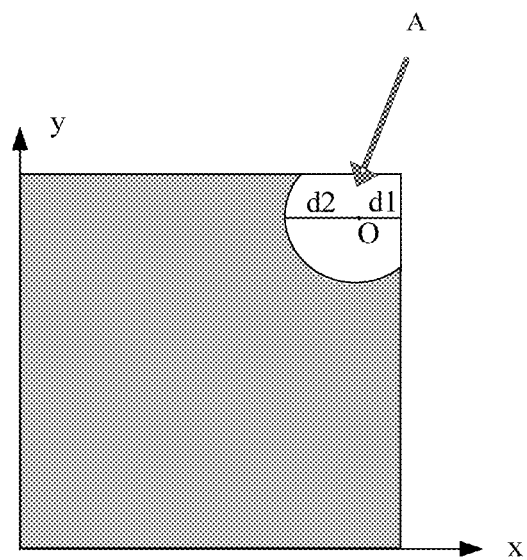

Considering that the cases shown in FIG. 2B and FIG. 2C exist, it is necessary to find a boundary of the light spot in a second direction (namely, a −x direction) opposite to the first direction.

Step 703: Determine a boundary of the light spot in a second direction.

Similarly to the foregoing algorithm, grey values of pixels that are at distances from the central point of the light spot may be sequentially calculated in ascending order of distances along the second direction, and a previous pixel of a pixel with a grey value abruptly changing from that of the previous pixel in the second direction is used as the boundary of the light spot in the second direction.

Likewise, if the grey value of a pixel is greater than or equal to a threshold of grey value such as the average grey value of the image, it is considered that the pixel belongs to the region of the light spot. Conversely, if the grey value of the pixel is less than the average grey value of the image, it is considered that the pixel does not belong to the region of the light spot. Therefore, a previous pixel of a pixel with a grey value abruptly changing from that of the previous pixel is less than the average grey value of the image is served as the boundary of the light spot in the second direction, and is recorded as a second pixel. A distance between the second pixel and the central point of the light spot is recorded as a second distance d2. In addition, in the foregoing calculation process, if it is found that the calculated pixel is already located at the boundary of the image, calculation is stopped. Likewise, the pixel is recorded as the second pixel, and the second distance d2 is obtained.

Step 704: Determine a size of the light spot according to a distance between the boundary of the light spot and the central point of the light spot.

Herein, the larger value of the first distance d1 and the second distance d2 is selected as the size of the light spot.

Step 705: Determine, according to the determined boundary of the light spot, whether the light spot is a valid light spot.

For example, when the size of the light spot determined in step 704 is less than a threshold, such as 5, it is considered that the light spot is caused by noise, and the light spot is excluded. In this case, the frame of image actually does not include any light spot.

Figure 2D:
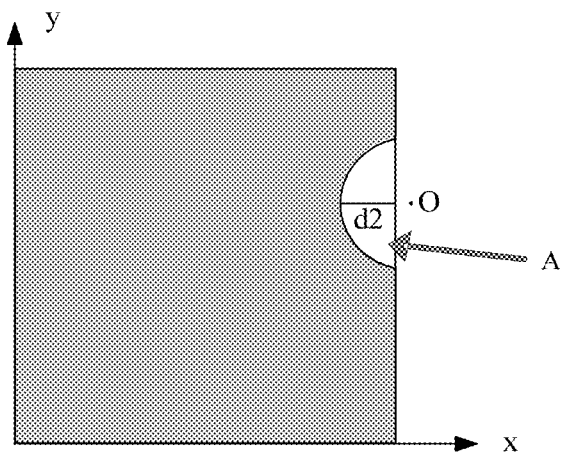
Figure 2E:
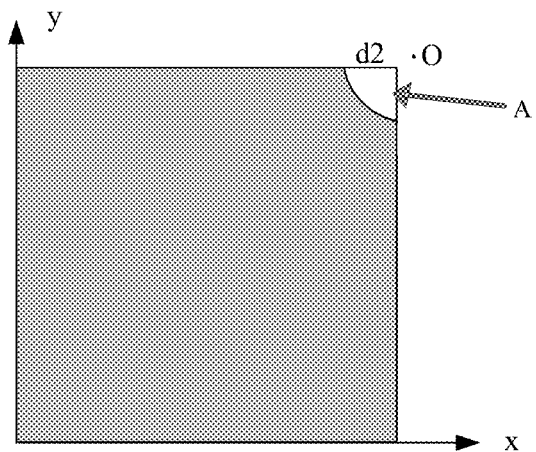

In practical use, cases shown in FIG. 2D and FIG. 2E also exist. In these cases, a severer emitter deviation occurs, and the center O of the light spot is located outside the boundary of the image. Therefore, the first distance d1 is actually 0. Only one valid second distance d2 can be calculated. Although it is technically possible to process this type of light spot, when the first distance d1 and the second distance d2 are 0, the light spot may be excluded as an invalid light spot.

By performing steps 701 to 705, whether a light spot exists in a frame of image can be identified, and a boundary of the light spot can be identified.

Preferably, before the process, noise reduction processing may be performed on a frame of image to improve image quality and reduce a probability of invalid light spots.

It should be noted that in this embodiment, the boundary of the light spot can be determined from only two directions (+x direction and −x direction). However, it is understandable that in other embodiments, the boundary of the light spot may be determined from fewer directions such as from one direction (taking the +x direction as an example); or the boundary of the light spot may be determined from more directions such as four directions (+x direction, −x direction, +y direction, and −y direction). Determining a boundary of a light spot from one direction is enough for the case shown in FIG. 2A. In this case, light spots in all the cases in FIG. 2B to FIG. 2E are considered as invalid light spots.

The following provides a processing example of the process shown in FIG. 8.

It is assumed that an image includes M×N pixels, and a grey value of each pixel is g(i, j), where i=1, 2, . . . , M, and j=1, 2, . . . , N. The (i, j) indicates coordinates of a pixel in the image, i represents a horizontal coordinate, i.e. a column coordinate, and j represents a vertical coordinate, i.e. a row coordinate. For example, a grey value of a pixel in row 3 and column 4 may be represented by g(4, 3).

Firstly, operations are performed on rows to find a maximum grey value gm (i) in each row, where i=1, 2, . . . , M. Then, a maximum value g(s, t)=gmax is found in gm, and this value is also a maximum grey value in the entire image. The (s, t) are coordinates of a pixel having a maximum grey value. In addition, an average grey value $\Delta$ of the entire image is calculated.

An expression gm(s−k)−$\Delta$ is calculated, where k=1, 2, . . . , k1, k1 satisfies gm(s−k1)−$\Delta$≥0, and gm(s−k1−1)−$\Delta$<0. Herein, an abrupt change of grey value occurs at k1+1, and a pixel represented by a previous value k1 thereof is considered as a boundary of a light spot in one direction. More than one k1 satisfying the abrupt change may exist, but calculation is stopped after the first or minimum k1 is calculated. If a boundary of the image is reached before the abrupt change point is found, the k1 in this case is also recorded.

An expression gm(s+k)−$\Delta$ is calculated, where k=1, 2, . . . , k2, k2 satisfies gm(s+k2)−$\Delta$≥0, and gm(s+k2+1)−$\Delta$<0. Herein, an abrupt change of grey value occurs at k2+1, and a pixel represented by a previous value k2 thereof is considered as a boundary of the light spot in another direction. More than one k2 satisfying the abrupt change may exist, but calculation is stopped after the first or minimum k2 is calculated. If the boundary of the image is reached before the abrupt change point is found, the k2 in this case is also recorded.

Therefore, a brightest light spot center (s, t) is determined, and a radius thereof is km=max(k1, k2).

Then, invalid light spots are excluded. Firstly, if km≥5, km is a radius of the brightest light spot. Otherwise, g(s, t) is noise, calculation ends, and it is considered that no light spot exists in the image. Secondly, if k1 or k2 is equal to 0, it is also considered that the light spot is invalid.

Figure 9:
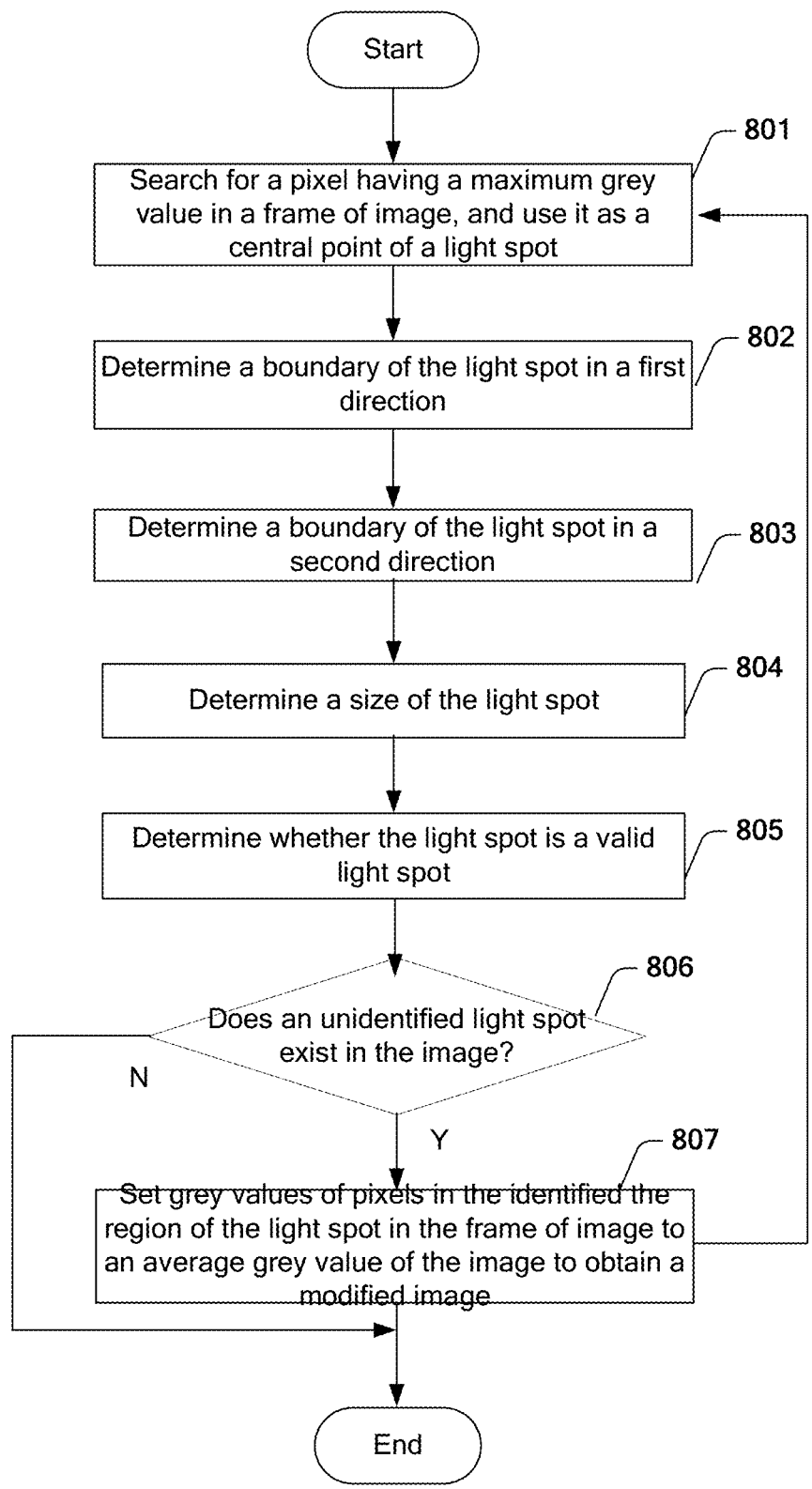
FIG. 9 shows a flowchart of a method for identifying a light spot in an image according to another embodiment of the disclosure.

The identification process in the embodiment shown in FIG. 8 is mainly concerned about whether a light spot exists in an image and concerned about the boundary of the light spot. As described above, a case (as shown in FIG. 3) in which one frame of image includes a plurality of light spots exists. If the identification process is further concerned about the number of light spots included in an image, step 602 a process shown in FIG. 9 may be implemented. Reference is made to FIG. 9:

Step 801: Search for a pixel having a maximum grey value in a frame of image, and use it as a central point of a light spot.

Step 802: Determine a boundary of the light spot in a first direction.

Similarly to the algorithm in the foregoing embodiment, grey values of pixels that are at distances from the central point of the light spot may be sequentially calculated in ascending order of distances along the first direction, and a previous pixel of a pixel with a grey value in the first direction is used as the boundary of the light in the first direction.

That is, in the foregoing calculation process, the grey values of the pixels are compared with a threshold of grey value. If the grey value of a pixel is greater than or equal to a threshold of grey value such as an average grey value of the image, it is considered that the pixel belongs to the region of the light spot. conversely, if the grey value of the pixel is less than the average grey value of the image, it is considered that the pixel does not belong to the region of the light spot. A previous pixel of a pixel with a grey value abruptly changing from that of the previous pixel is less than the average grey value of the image is used as the boundary of the light spot in the first direction, and is recorded as a first pixel. A distance between the first pixel and the central point of the light spot is recorded as a first distance.

In addition, in the calculation process in step 802, if the calculated pixel is already located at a boundary of the image, calculation is stopped. Likewise, the pixel is recorded as the first pixel, and the first distance d1 is obtained.

Step 803: Determine a boundary of the light spot in a second direction.

Similarly to the foregoing algorithm, grey values of pixels that are at distances from the central point of the light spot are sequentially calculated in ascending order of distances along the second direction, and a previous pixel of a pixel with a grey value abruptly changing from that of the previous pixel in the second direction is used as the boundary of the light spot in the second direction.

That is, if the grey value of a pixel is greater than or equal to a threshold of grey value such as the average grey value of the image, it is considered that the pixel belongs to the region of the light spot. Conversely, if the grey value of the pixel is less than the average grey value of the image, it is considered that the pixel does not belong to the region of the light spot. Therefore, a previous pixel of a pixel with a grey value abruptly changing from that of the previous pixel is less than the average grey value of the image is used as the boundary of the light spot in the second direction, and is recorded as a second pixel. A distance between the second pixel and the central point of the light spot is recorded as a second distance d2. In addition, in the foregoing calculation process, if it is found that the calculated pixel is already located at the boundary of the image, calculation is stopped. Likewise, the pixel is recorded as the second pixel, and the second distance d2 is obtained.

Step 804: Determine a size of the light spot according to a distance between the boundary of the light spot and the central point of the light spot.

Herein, the greater value of the first distance d1 and the second distance d2 is selected as the size of the light spot.

Step 805: Determine, according to the determined boundary of the light spot, whether the light spot is a valid light spot.

By performing steps 801 to 805, whether a light spot exists in a frame of image can be identified, and a boundary of the light spot can be identified.

In addition, if in step 805 the determined size of the light spot is less than a threshold such as 5, it is considered that the light spot is caused by noise. When the light spot is considered as an invalid light spot, it is considered that the frame of image actually does not include any light spot. Therefore, in step 806 of determining whether an unidentified light spot may exist in the image, the process ends.

In other cases, for example, after a light spot (as shown in FIG. 2D and FIG. 2E) that deviates too much from the image region is excluded, it is considered that the image may still include an unidentified light spot, and the process proceeds to step 807.

Step 807: Set grey values of pixels in the identified the region of the light spot in the frame of image to an average grey value of the image to obtain a modified image. Then go back to step 801 to identify another light spot.

A purpose of step 807 is to exclude the region of the identified light spot in subsequent processing. Viewed from results, the subsequent processing is actually to search for a maximum grey value outside the region of the identified light spot in the image. It is understandable that in practical processing, the foregoing modification may not be made. Instead, the search is directly performed outside the region of the identified light spot.

In this way, each time identifying a light spot, grey values in the region of the identified light spot in the current image are set to the average grey value of the image. This cycle continues like this until step 806 in which it is determined that the frame of image does not include any other unidentified light spot. In this case, the whole process ends.

The following provides a processing example of the process shown in FIG. 9.

It is assumed that an image includes M×N pixels, where a grey value of each pixel is g(i, j), i=1, 2, ..., M, and j=1, 2, ..., N.

Firstly, operations are performed on rows to find a maximum grey value gm(i) in each row, where i=1, 2, ..., M. Then, a maximum value g(s, t)=gmax is found in gm, and this value is also a maximum grey value in the entire image. The (s, t) indicates coordinates having a pixel of a maximum grey value. In addition, an average grey value Δ of the entire image is calculated An expression gm(s−k)−Δ is calculated in ascending order of k, where k=1, 2, ..., k1, k1 satisfies gm(s−k1)−Δ≥0, and gm(s−k1−1)−Δ<0. Herein, an abrupt change of grey values occurs at k1+1, and a pixel represented by a previous value k1 thereof is considered as a boundary of a light spot in one direction. It should be noted that more than one k1 satisfying the abrupt change may exist, but calculation is stopped after the first or minimum k1 is calculated. If a boundary of the image is reached before the abrupt change point is found, the k1 in this case is also recorded.

An expression gm(s+k)−Δ is calculated in ascending order of k, where k=1, 2, ..., k2, k2 satisfies gm(s+k2)−Δ≥0, and gm(s+k2+1)−Δ<0. Herein, an abrupt change of grey values occurs at k2+2, and a pixel represented by a previous value k2 thereof is considered as a boundary of the light spot in another direction. More than one k2 satisfying the abrupt change may exist, but calculation is stopped after the first or minimum k2 is calculated. If the boundary of the image is reached before the abrupt change point is found, the k2 in this case is also recorded.

Therefore, a brightest light spot center (s, t) is determined, and a radius of the light spot is km=max(k1, k2).

Figure 4:
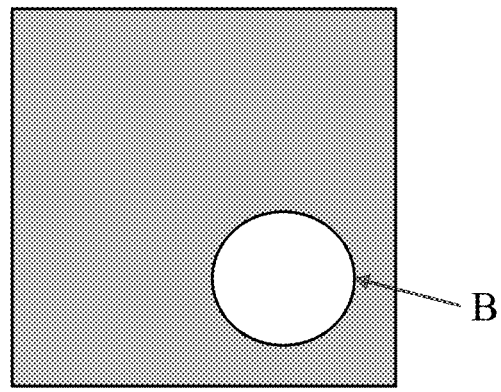
FIG. 4 shows a modified frame of image from which an identified light spot is removed.

Then, invalid light spots are excluded. Firstly, if km≥5, km is the radius of the brightest light spot. Otherwise, g(s, t) is noise, calculation ends, and it is considered that no light spot exists in the image. Secondly, if k1 or k2 is equal to 0, it is also considered that the light spot is invalid. If a valid light spot A can be found in the foregoing process, after the light spot A is found, grey values in regions [s−km, s+km] and [t−km, t+km] are all set to Δ, and a modified image shown in FIG. 4 is obtained. Likewise, according to the foregoing method, a light spot B may be found. When more light spots exist, regions of all light spots may be determined in sequence according to this method.

Although light spots and the number of the light spot can be correctly identified in the process shown in FIG. 7, the process may be unnecessarily complex. That is because a large amount of calculation is required for identifying whether a light spot exists in an image if calculation is performed according to an original resolution of the image. However, identifying whether light spots exist in the image and identifying the number of light spots do not require high resolutions. Therefore, another embodiment of the disclosure provides a simplified solution.

Figure 10:
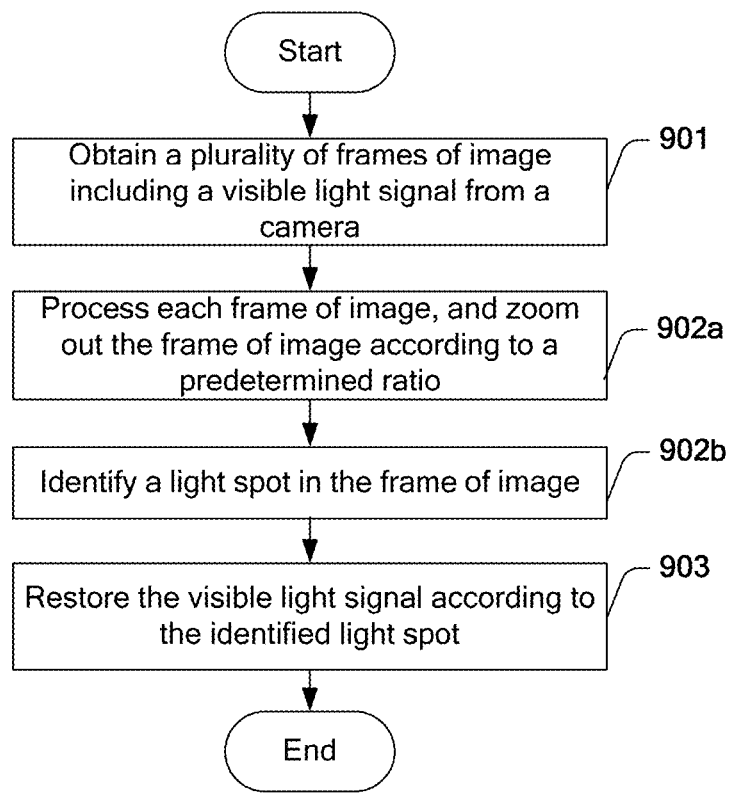
FIG. 10 shows a flowchart of a method for identifying a visible light signal received by a camera according to another embodiment of the disclosure.

FIG. 10 shows a flowchart of a method for identifying a visible light signal received by a camera according to another embodiment of the disclosure. Referring to FIG. 10, the method includes the following steps:

Step 901: Obtain a plurality of frames of image including a visible light signal from a camera.

Step 902a: Process each frame of image, and zoom out the frame of image according to a predetermined ratio.

That is, a resolution of the image is reduced according to a predetermined ratio.

Step 902b: Identify a light spot in the frame of image.

Step 903: Restore the visible light signal according to the identified light spot.

It is understandable that the foregoing process is generally performed according to a streamline mode. That is, each time obtaining a frame of image, image processing is performed, and a visible light signal in the frame of image is restored.

It may be seen that a difference between the foregoing embodiment and the embodiment shown in FIG. 10 lies in that the frame of image is zoomed out according to a predetermined ratio before the light spot in each frame of image is identified. This reduces the resolution of the image, and thereby also reduces the amount of calculation required for processing the image. In this way, the method is simplified.

In this embodiment, the predetermined ratio is a common divisor of the number of row pixel and the number of column pixel of the frame of image. For example, for an image whose resolution is 800×600 (that is, the number of row pixel is 800, and the number of column pixel is 600), the number 8 may be selected as the predetermined ratio. That is, the resolution of image is zoomed out to 100×75.

It is understandable that calculation complexity and identification accuracy may be compromised by the predetermined ratio. For example, it may be required that, in the frame of image that is zoomed out, both the number of row pixel and the number of column pixel should be greater than a threshold, so that light spots of a required quantity can be identified.

For example, four adjacent pixels of an image with a resolution of M×N may be used as one unit for calculation. That is, each 2×2 pixels are used as a unit. In this way, the image is simplified to a resolution of M/2×N/2. For example, an average value pixels (1, 1), (1, 2), (2, 1), and (2, 2) is calculated beforehand and used as a new pixel (1, 1). Generally, pixels (2i−1, 2j−1), (2i−1, 2j), (2i, 2j−1), and (2i, 2j) of the original image correspond to a pixel (i, j) of the simplified image, where 1≤i≤M/2, 1≤j≤N/2, g'(i, j)=(g(2i−1, 2j−1)+g(2i−1, 2j)+g(2i, 2j−1)+g(2i, 2j))/4, and I' represents a grey value of the simplified image. (i, j) represents a coordinate of a pixel in the simplified image. The letter i represents a horizontal coordinate, i.e. a column coordinate. The letter j represents a vertical coordinate, i.e. a row coordinate. For example, a grey value of a parent pixel in row 3 and column 4 may be indicated by I'(4, 3).

Further, if a common divisor of M and N includes one of values p1, p2, . . . , pm, the image may be simplified to M/pg×N/pg, where 1≤g≤m. Certainly, if pg is too great, the resolution may be affected. Therefore, it is necessary to make a compromise between an image processing speed and a resolution.

It is understandable that in the process shown in FIG. 10, step 902b may be implemented by the process of the embodiment shown in FIG. 8 or FIG. 9.

When visible light is received, a frame rate of the used camera needs to be capable of matching a data transmission rate of visible light transmitted by a transmit end. For example, if a visible light signal are transmitted by a transmit end at a bit rate approximately 50 bps (bits per second), it is required that the camera should have a frame rate at least 100 fps (frames per second).

Most cameras can satisfy the foregoing frame rate requirement. However, for some cameras such as a camera used for shooting video, a low frame rate of 25 fps or 30 fps is generally set. Therefore, in a process of receiving a visible light signal, it is necessary to adaptively adjust the cameras to a high frame rate mode.

Adjustment of the frame rate of the camera may be completed by modifying a CMOS register by a single-chip microcomputer, and a protocol is I$^2$C. Devices related to adjustment of the frame rate of the camera may be shown in FIG. 7.

A start code of a predetermined sequence at the beginning of the visible light signal may be prescribed to instruct the camera to adjust to the high frame rate mode. Likewise, if necessary, an end code of a predetermined sequence at the end of the visible light signal may be prescribed to instruct the camera to adjust back to the low frame rate mode.

Figure 11:
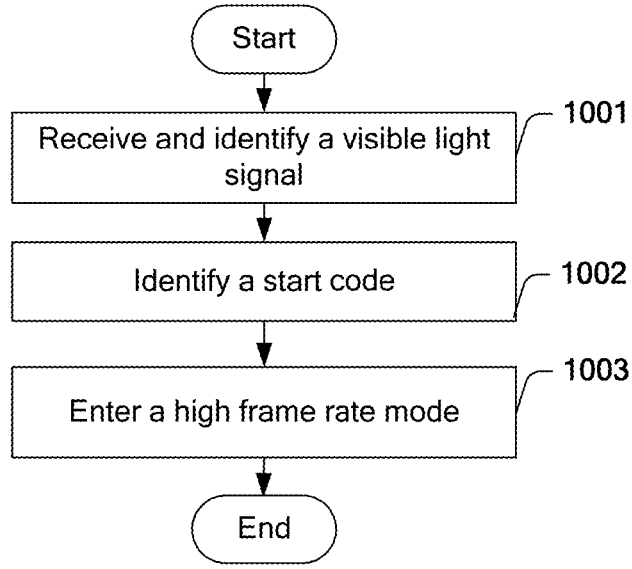
FIG. 11 shows a flowchart of adjusting a frame rate of a camera according to an embodiment of the disclosure.

FIG. 11 shows a flowchart of adjusting a frame rate of the camera according to an embodiment of the disclosure. Assuming that the camera is normally in a low frame rate mode, the camera is adjusted to a high frame rate mode according to a process of FIG. 9.

In step 1001, the camera receives and identifies a visible light signal. The identification in this step may be implemented by referring to the process in FIG. 7 or FIG. 9. A start code of the visible light signal may be obtained through the identification. Then, in step 1002, whether the start code belongs to a prescribed predetermined sequence is identified. If yes, in step 1003, the camera is switched to the high frame rate mode.

Figure 5:
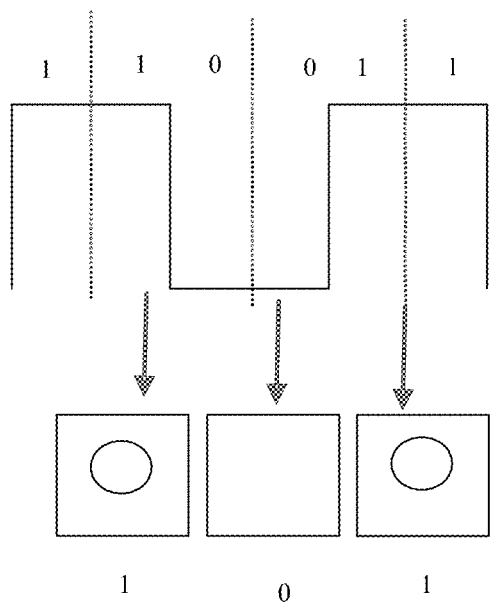
FIG. 5 shows a schematic view of identifying a start code of a visible light signal in a low frame rate mode in a method according to an embodiment of the disclosure.
Figure 6:
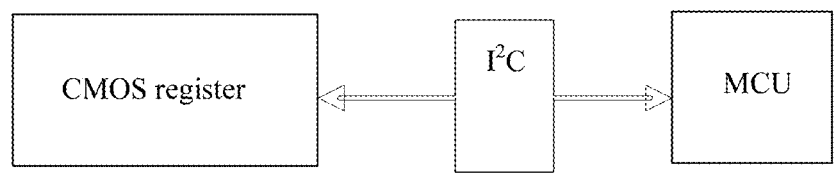
FIG. 6 shows a schematic view of modifying a register of a photosensitive device of a camera according to an embodiment of the disclosure.

FIG. 5 shows a schematic view of identifying a start code of a visible light signal in a low frame rate mode in a method according to an embodiment of the disclosure. Referring to FIG. 5, assuming that a transmission rate of a visible light signal at a transmit end is 50 bps, where a start code is 110011, information captured by a camera whose frame rate is 30 fps is only three images, which are shot at the 33rd ms, the 67th ms, and the 100th ms respectively. The first and third images have light spots, but the second image has no light spot. A result of the identification is that values corresponding to the three images are 1, 0, and 1 respectively.

Therefore, if the start code received at the low frame rate is 0x101, the camera is started and enters the high frame rate (e.g. 120 fps) mode.

Similarly, the end code of the signal is set, for example, 0x111. After receiving the end code, the camera automatically switches back to the low frame rate (e.g. 30 fps) mode.

Another embodiment of the disclosure provides an apparatus for identifying a visible light signal received by a camera. The apparatus includes: a module configured to obtain, from the camera, a plurality of frames of image including a visible light signal; a module configured to process each frame of image to identify a light spot in the frame of image; and a module configured to restore the visible light signal according to the identified light spot.

The module configured to process each frame of image to identify a light spot in the frame of image further includes: a module configured to search for a pixel having a maximum grey value in the frame of image, and use it as a central point of a first light spot; a module configured to sequentially calculate, in ascending order of distances along a first direction, grey values of pixels that are at distances from the central point of the first light spot, and use a previous pixel of a pixel with a grey value abruptly changing from that of the previous pixel in the first direction as a boundary of the first light spot in the first direction; a module configured to sequentially calculate, in ascending order of distances along a second direction, grey values of pixels that are at distances from the central point of the first light spot, and use a previous pixel of pixel with a grey value abruptly changing from that of the previous pixel in the second direction as a boundary of the first light spot in the second direction; a module configured to select a greater value of a distance between the boundary of the first light spot in the first direction and the central point of the first light spot and a distance between the boundary of the first light spot in the second direction and the central point of the first light spot, as a size of the first light spot; and a module configured to determine, according to the determined boundary of the first light spot, whether the first light spot is a valid light spot.

In an exemplary embodiment, in the module configured to sequentially calculate, in ascending order of distances along a first direction, grey values of pixels that are at distances from the central point of the first light spot, and use a previous pixel of a pixel with a grey value abruptly changing from that of the previous pixel in the first direction as a boundary of the first light spot in the first direction, if a grey value of a first pixel is less than an average grey value of the frame of image, a previous pixel of the first pixel is used as the boundary of the first light spot in the first direction. Otherwise, a boundary of the frame of image in the first direction is used as the boundary of the first light spot in the first direction.

In an exemplary embodiment, in the module configured to sequentially calculate, in ascending order of distances along a second direction, grey values of pixels that are at distances from the central point of the first light spot, and use a previous pixel of pixel with a grey value abruptly changing from that of the previous pixel in the second direction as a boundary of the first light spot in the second direction, if a grey value of a second pixel is less than an average grey value of the frame of image, a previous pixel of the second pixel is used as the boundary of the first light spot in the second direction. Otherwise, a boundary of the frame of image in the second direction is used as the boundary of the first light spot in the second direction.

In an exemplary embodiment, the first direction is opposite to the second direction.

In an exemplary embodiment, the module configured to process each frame of image to identify a light spot in the frame of image further includes: a module configured to set grey values of pixels in the first light spot in the frame of image to an average grey value of the image to obtain a modified image; a module configured to search for a pixel having a maximum grey value in the modified image, and use it as a central point of a second light spot; a module configured to sequentially calculate, in ascending order of distances along a first direction, grey values of pixels that are at distances from the central point of the second light spot, and use a previous pixel of pixel with a grey value abruptly changing from that of the previous pixel in the first direction as a boundary of the second light spot in the first direction; a module configured to sequentially calculate, in ascending order of distances along a second direction, grey values of pixels that are at distances from the central point of the second light spot, and use a previous pixel of a pixel with a grey value abruptly changing from that of the previous pixel in the second direction as a boundary of the second light spot in the second direction; a module configured to select a greater value of a distance between the boundary of the second light spot in the first direction and the central point of the second light spot and a distance between the boundary of the second light spot in the second direction and the central point of the second light spot, as a size of the second light spot; and a module configured to determine, according to the determined boundary of the second light spot, whether the second light spot is a valid light spot.

In an exemplary embodiment, the module configured to process each frame of image to identify a light spot in the frame of image further includes a module configured to zoom out the image according to a predetermined ratio.

In an exemplary embodiment, the predetermined ratio is a common divisor of the pixel number in a row and the pixel number in a column of the frame of image.

In an exemplary embodiment, when the camera is normally in a low frame rate mode, the apparatus further includes: a module configured to identify a start code with a predetermined sequence in the visible light signal; and a module configured to switch the camera to a high frame rate mode according to the identified start code.

In an exemplary embodiment, the apparatus further includes: a module configured to identify an end code with a predetermined sequence in the visible light signal; and a module configured to switch the camera to a low frame rate mode according to the identified end code.

The apparatus for identifying a visible light signal received by a camera in the disclosure may be used as a optical receiver of a visible light communication system.

Each embodiment described in the application document may be implemented, for example, in computer software, hardware, or a computer-readable medium having a combination of computer software and hardware. For hardware implementation, the embodiment described in the application document may be implemented by one or more application-specific integrated circuits (ASIC), a digital signal processor (DSP), a digital signal processor (DAPD), a programmable logic device (PLD), a field programmable gate array (FPGA), a processor, a controller, a micro controller, a micro processor, or other electronic apparatuses configured to execute the foregoing functions or a selection combination of the foregoing apparatuses. In some cases, this type of embodiment may be implemented by a controller.

For software implementation, the embodiment described in the application document may be implemented by independent software modules such as a program module (procedures) and a function module (functions), where each module executes one or more functions and operations described in the application document. Software code may be implemented by application software compiled in an appropriate programming language, and may be stored in a memory, and executed by a controller or a processor.

Although the disclosure is described in detail with reference to specific embodiments, a person of ordinary skill in the art should understand that the foregoing embodiments are intended for describing the disclosure only, and that various equivalent changes or replacements may be made without departing from the spirit of the disclosure. Therefore, all changes or variations made to the foregoing embodiments without departing from the spirit of the disclosure shall fall within the scope of the claims of the present application.

What is claimed is:

1. A method for receiving a visible light signal, comprising:
    controlling use of a camera as a light signal receiver to capture a group of continuous images covering an emitter, the emitter emits visible light signals, the group of continuous images includes an image of a visible light signal of the emitter and background image;
    obtaining a visible light signal emitted by the emitter from the group of continuous images, specifically comprises: dividing the group of continuous images into a plurality of images;
    comparing luminance variation with time of each region with a predetermined size of all images, selecting a region with continuous varying luminance, and determining that a visible light signal that comes from the emitter exists in the region; and
    analyzing and processing luminance changes of the region of all the images to obtain a visible light signal that comes from the emitter, outputting the image of a visible light signal of the emitter when the images captured by the camera include the visible light signal of the emitter; outputting the background images when the images captured by the camera do not include the visible light signal of the emitter;
    processing the visible light signal to restore original information.

2. The method according to claim 1, wherein the comparing luminance variation with time of each region with a predetermined size of all images comprises analyzing variation with time of average grey value of each region with the predetermined size;
    and the step of processing the visible light signal comprises decoding, decryption, and/or descrambling.

3. The method according to claim 1, wherein:
    in the step of dividing the group of continuous images into a plurality of images, the images are frames of image; and
    the step of selecting a region with continuous varying luminance, and determining that a visible light signal exists in the region comprises processing each frame of image according to the following steps to identify a light spot in the frame of image:
        searching for a pixel having a maximum grey value in the frame of image, and using it as a central point of a first light spot;
        determining a boundary of the first light spot;
        determining a size of the first light spot according to a distance between the boundary of the first light spot and the central point of the first light spot;
        determining, according to the determined boundary and size of the first light spot, whether the first light spot is a valid light spot; and
    restoring the visible light signal according to the identified light spot.

4. The method according to claim 3, wherein the step of determining a boundary of the first light spot comprises:
    sequentially calculating, in ascending order of distances along a first direction, grey values of pixels that are at distances from the central point of the first light spot, and using a previous pixel of a pixel with a grey value abruptly changing from that of the previous pixel in the first direction as a boundary of the first light spot in the first direction, comprises: if a grey value of a first pixel is less than a threshold grey value, using a previous pixel of the first pixel as the boundary of the first light spot in the first direction, or otherwise, using a boundary of the frame of image in the first direction as the boundary of the first light spot in the first direction; and
    sequentially calculating, in ascending order of distances along a second direction, grey values of pixels that are at distances from the central point of the first light spot, and using a previous pixel of a pixel with a grey value abruptly changing from that of the previous pixel in the second direction as a boundary of the first light spot in the second direction, comprises: if a grey value of a second pixel is less than the threshold of grey value, using a previous pixel of the second pixel as the boundary of the first light spot in the second direction, or otherwise, using a boundary of the frame of image in the second direction as the boundary of the first light spot in the second direction, where the first direction is opposite to the second direction, and the threshold of grey value is an average grey value of the frame of image.

5. The method according to claim 4, wherein the step of determining, according to the determined size of the first light spot, whether the first light spot is a valid light spot, comprises: determining whether the size of the first light spot is greater than a threshold, and if yes, determining that the first light spot is a valid light spot, the greater one of a distance between the boundary of the first light spot in the first direction and the central point of the first light spot and a distance between the boundary of the first light spot in the second direction and the central point of the first light spot is selected as the size of the first light spot.

6. The method according to claim 3, wherein the step of determining, according to the determined boundary of the first light spot, whether the first light spot is a valid light spot, comprises: determining whether any boundary of the first light spot is located at a boundary of the image, and if no, determining that the first light spot is a valid light spot.

7. The method according to claim 3, further comprising identifying a second light spot in the frame of image according to the following steps:
    searching for a pixel of a maximum grey value in regions outside the first light spot in the frame of image, and using it as a central point of the second light spot, comprises: setting grey values of pixels in the first light spot in the frame of image to an average grey value of the image to obtain a modified image; and searching for a pixel of a maximum grey value in the modified image;
determining a boundary of the second light spot;
determining a size of the second light spot according to a distance between the boundary of the second light spot and the central point of the second light spot; and
determining, according to the determined boundary and size of the second light spot, whether the second light spot is a valid light spot.

8. The method according to claim 3, wherein the step of determining a boundary of the second light spot comprises:
sequentially calculating, in ascending order of distances along a first direction, grey values of pixels that are at distances from the central point of the second light spot, and using a previous pixel of a pixel with a grey value abruptly changing from that of the previous pixel in the first direction as a boundary of the second light spot in the first direction, comprises: if a grey value of a first pixel is less than a threshold of grey value, using a previous pixel of the first pixel as the boundary of the second light spot in the first direction, or otherwise, using a boundary of the frame of image in the first direction as the boundary of the second light spot in the first direction; and
sequentially calculating, in ascending order of distances along a second direction, grey values of pixels that are at distances from the central point of the second light spot, and using a previous pixel of a pixel with a grey value abruptly changing from that of the previous pixel in the second direction as a boundary of the second light spot in the second direction, if a grey value of a second pixel is less than the threshold of grey value, using a previous pixel of the second pixel as the boundary of the second light spot in the second direction, or otherwise, using a boundary of the frame of image in the second direction as the boundary of the second light spot in the second direction, and the threshold of grey value is an average grey value of the frame of image.

9. The method according to claim 3, wherein the step of processing each frame of image to identify a light spot in the frame of image further comprises:
zooming out the frame of image according to a predetermined ratio, where the predetermined ratio is a common divisor of the pixel number in a row and the pixel number in a column of the image.

10. The method according to claim 3, wherein when the camera is normally in a low frame rate mode, the method further comprises:
identifying a start code of a predetermined sequence in the visible light signal; and
switching the camera to a high frame rate mode;
or,
identifying an end code of a predetermined sequence in the visible light signal; and
switching the camera to a low frame rate mode;
the method for switching a frame rate mode of the camera comprising: modifying a register of a photosensitive device of the camera.

11. An apparatus for receiving a visible light signal, which comprises a hardware processor and a memory, wherein the hardware processor is configured to execute programming modules stored in the memory, wherein the programming modules comprise:
a module configured to control use of a camera as a light signal receiver to capture a group of continuous images covering an emitter, the emitter emitting visible light signals, the group of continuous images includes an image of a visible light signal of the emitter and background image;
a module configured to obtain, from the group of continuous images, a visible light signal that comes from the emitter, comprising:
a module configured to divide the group of continuous images into a plurality of images;
a module configured to compare luminance variation with time of each region with a predetermined size of all images, select a region with continuous varying luminance, and determine that a visible light signal that comes from the emitter exists in the region;
a module, configured to analyze and process luminance changes of the region of all the images to obtain the visible light signal that comes from the emitter, output the image of a visible light signal of the emitter when the images captured by the camera include the visible light signal of the emitter; output the background images when the images captured by the camera do not include the visible light signal of the emitter; and
a module configured to processing the visible light signal to restore original information.

12. The apparatus according to claim 11, wherein the process of comparing luminance of variation with time of each region with a predetermined size of all images comprises analyzing a variation with time of average grey value of each region with the predetermined size, the module configured to processing visible light signal to restore original information performs decoding, decryption, and/or descrambling.

13. The apparatus according to claim 11, wherein:
the module configured to control use of a camera as a light signal receiver to capture a group of continuous images covering an emitter comprises: a module configured to obtain, from the camera, a plurality of frames of image comprising a visible light signal; and
the module configured to obtain, from the group of continuous images, a visible light signal that comes from the emitter, comprises: a module configured to process each frame of image to identify a light spot in the frame of image, comprising:
a module configured to search for a pixel having a maximum grey value in the frame of image, and use it as a central point of a first light spot;
a module configured to determine a boundary of the first light spot;
a module configured to determine a size of the first light spot according to a distance between the boundary of the first light spot and the central point of the first light spot;
a module configured to determine, according to the determined boundary and size of the first light spot, whether the first light spot is a valid light spot; and
a module configured to restore the visible light signal according to the identified light spot.

14. The apparatus according to claim 13, wherein the module configured to determine a boundary of the first light spot comprises:
a module configured to sequentially calculate, in ascending order of distances along a first direction, grey values of pixels that are at distances from the central point of the first light spot, and use a previous pixel of a pixel with a grey value abruptly changing from that of the previous pixel in the first direction as a boundary of the first light spot in the first direction; if a grey value of a first pixel is less than a threshold of grey value, a previous pixel of the first pixel is used as the boundary of the first light spot in the first direction, or otherwise, a boundary of the frame of image in the first direction is used as the boundary of the first light spot in the first direction; and a module configured to sequentially calculate, in ascending order of distances along a second direction, grey values of pixels that are at distances from the central point of the first light spot, and use a previous pixel of a pixel with a grey value abruptly changing from that of the previous pixel in the second direction as a boundary of the first light spot in the second direction; if a grey value of a second pixel is less than the threshold of grey value, a previous pixel of the second pixel is used as the boundary of the first light spot in the second direction, or otherwise, a boundary of the frame of image in the second direction is used as the boundary of the first light spot in the second direction, where the first direction is opposite to the second direction, and the threshold of grey value is an average grey value of the frame of image.

15. The apparatus according to claim 13, wherein the module configured to determine, according to the determined boundary and size of the first light spot, whether the first light spot is a valid light spot, determines whether any boundary of the first light spot is located at a boundary of the image, and if no, determines that the first light spot is a valid light spot; or the module configured to determine, according to the determined boundary and size of the first light spot, whether the first light spot is a valid light spot, determines whether the size of the first light spot is greater than a threshold, and if yes, determines that the first light spot is a valid light spot.

16. The apparatus according to claim 13, wherein the module configured to process each frame of image to identify a light spot in the frame of image further comprises:
 a module configured to search for a pixel having a maximum grey value in regions outside the first light spot in the frame of image, and use it as a central point of the second light spot, comprises: a module configured to set grey values of pixels in the first light spot in the frame of image to an average grey value of the image to obtain a modified image, and a module configured to search for a pixel having a maximum grey value in the modified image;
 a module configured to determine a boundary of the second light spot;
 a module configured to select a distance between the boundary of the second light spot and the central point of the second light spot as a size of the second light spot; and
 a module configured to determine, according to the determined boundary of the second light spot, whether the second light spot is a valid light spot.

17. The apparatus according to claim 16, wherein the module configured to determine a boundary of the second light spot comprises:
 a module configured to sequentially calculate, in ascending order of distances along a first direction, grey values of pixels that are at distances from the central point of the second light spot, and use a previous pixel of a pixel with a grey value abruptly changing from that of the previous pixel in the first direction as a boundary of the second light spot in the first direction; if a grey value of a first pixel is less than a threshold of grey value, a previous pixel of the first pixel is used as the boundary of the first light spot in the first direction, or otherwise, a boundary of the frame of image in the first direction is used as the boundary of the first light spot in the first direction; and
 a module configured to sequentially calculate, in ascending order of distances along a second direction, grey values of pixels that are at distances from the central point of the second light spot, and use a previous pixel of a pixel with a grey value abruptly changing from that of the previous pixel in the second direction as a boundary of the second light spot in the second direction; if a grey value of a second pixel is less than the threshold of grey value, a previous pixel of the second pixel is used as the boundary of the first light spot in the second direction, or otherwise, a boundary of the frame of image in the second direction is used as the boundary of the first light spot in the second direction, where the first direction is opposite to the second direction, and the threshold of grey value is an average grey value of the frame of image.

18. The apparatus according to claim 13, wherein the module configured to process each frame of image to identify a light spot in the frame of image further comprises a module configured to zoom out the image according to a predetermined ratio, where the predetermined ratio is a common divisor of the pixel number in a row and the pixel number in a column of the frame of image.

19. The apparatus according to claim 13, wherein when the camera is normally in a low frame rate mode, the programming modules further comprise:
 a module configured to identify a start code of a predetermined sequence in the visible light signal;
 a module configured to switch the camera to a high frame rate mode according to the identified start code;
 a module configured to identify an end code of the predetermined sequence in the visible light signal; and
 a module configured to switch the camera to a low frame rate mode according to the identified end code.

* * * * *